United States Patent Office 3,284,390
Patented Nov. 8, 1966

3,284,390
PROCESS FOR PREPARING EPOXY-CONTAINING MATERIALS IN THE PRESENCE OF A BITUMINOUS MATERIAL
James R. Scheibli, Oakland, and Herbert A. Newey, Lafayette, Calif., assignors to Shell Oil Company, New York, N.Y., a corporation of Delaware
No Drawing. Filed Dec. 30, 1960, Ser. No. 79,574
10 Claims. (Cl. 260—28)

The invention relates to a new process for preparing epoxy-containing materials. More particularly, the invention relates to a new process for preparing epoxy-containing condensates from polyepoxides and certain acidic materials, to the resulting compositions and to their use, particularly for the preparation of surfacing compositions.

Specifically, the invention provides a new and highly efficient process for preparing compositions containing solvent soluble fusible epoxy-containing materials which may be used to give highly flexible castings and coatings. The process comprises heating a polycarboxylic acid or anhydride with at least 1.5 times the chemical equivalent amount of a polyepoxide containing more than one epoxy group in the presence of a bituminous or hydrocarbon material, and preferably a liquid petroleum product, such as a lube oil distillate or extract, asphalt, fuel oil and the like. The invention further provides new epoxy-containing compositions prepared by this process.

As a special embodiment, the invention provides a process for utilizing the above-described new compositions as sealer coatings alone or with aggregate for already prepared cement, asphalt or wood surfaces, and a process for utilizing the compositions as binders for aggregate in the construction of new surfaces or as thick overlays for other surfaces.

Copending application Serial No. 608,681, filed September 10, 1956, now U.S. Patent No. 2,970,983 discloses and claims new and valuable epoxy-containing materials which are obtained by reacting a polycarboxylic acid or anhydride with certain amounts of a polyepoxide in the presence of a catalyst. These materials have been found to be very useful for the preparation of coating compositions as they give films which are hard and tough and have excellent flexibility.

The preparation of these new epoxy-containing materials on a large scale by the above-noted process has, however, met with certain difficulties. It has been found, for example, that in some cases, and particularly with the polycarboxylic acids or anhydrides containing at least three carboxyl groups, as trimer acid obtained from polymerizing linoleic acid, there is a tendency of the mixture to gel before the reaction is complete. This necessitates the use of very careful control over the reaction conditions. In addition, additional purification is needed to remove the catalyst involved in the preparation.

It is, therefore, an object to provide a new process for the preparation of epoxy-containing materials. It is a further object to provide a process for preparing epoxy-containing materials by the condensation of polycarboxylic acids or anhydrides with polyepoxides. It is a further object to provide a new process for preparing epoxy materials by the condensation of acids or anhydrides with polyepoxides which can be easily conducted without danger of gelation. It is a further object to provide such a process that can be conducted without the use of added catalysts and without purification of resulting product to remove the catalyst. It is a further object to provide new compositions that can be cured at low or high temperatures to give insoluble infusible products. It is a further object to provide new compositions which are particularly useful for the surfacing of traffic areas. It is a further object to provide sealer compositions which can be used to give hard but flexible coatings to cement, asphalt and the like surfaces. It is a further object to provide new compositions which can be used as a binder composition for preparation of new traffic areas. It is a further object to provide compositions which give surfaces which are solvent and heat resistant. It is a further object to provide compositions which give surfaces which are non-skid. Other objects and advantages of the invention will be apparent from the following detailed description thereof.

It has now been found that these and other objects may be accomplished by the process of the invention which comprises heating a polycarboxylic acid or anhydride with at least 1.5 times the chemical equivalent amount of a polyepoxide containing more than one epoxy group in the presence of a bituminous or hydrocarbon material, and preferably a liquid petroleum product, such as a lube oil distillate or extract, asphalt, fuel oil and the like. It has been found that the above-noted new process, enables one to prepare epoxy-containing condensates without rigid controls to avoid gelation even with the highly functional reactants. Polycarboxylic acids containing at least three carboxyl groups, such as trimer acid, can, for example, be used in the new process without gelation. Furthermore, it has been surprisingly found that with materials, such as the petroleum derived hydrocarbons as asphalts, lube distillates and extracts and the like, the reaction takes place without the addition of catalytic materials. This results in an economic saving of material as well as avoids necessity of further purification. Finally, the new compositions have been found to be particularly useful as such for the preparation of surfaces for large areas as roadways, walkways and airstrips. The resulting cured surfaces have good hardness and adhesion, excellent flexibility and distensibility and good heat and solvent resistance.

When inert particles are added to the compositions before or during the cure, the coating compositions have in addition to the above-described superior properties good resistance to skidding when wet or when in contact with oils. When combined with aggregate and laid down in thick sections the products can be used to prepare new surfaces for vehicular, pedestrian or airplace traffic. Such surfaces are characterized by their improved strength, good distensibility and improved heat and solvent resistance.

The polyepoxides to be used in preparing the precondensates comprise those materials having more than one vicinal epoxy group, i.e., more than one

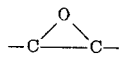

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used to prepare the precondensates are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadieneoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the polyepoxides used in making the pre-condensates include the epoxidized esters of unsaturated monohydric alcohols and polycarboxylic acids, such as, for example, di(2,3-epoxybutyl)adipate, di(2,3-epoxybutyl)oxalate, di(2,3-epoxyhexyl)succinate, di(2,3-epoxyoctyl)pimelate, di(2,3 - epoxybutyl)phthalate, di(2,3-epoxyoctyl)tetrahydrophthalate, as well as the esters of epoxycyclohexenol and epoxycyclohexanol and polycarboxylic acids as, for example, di(2,3-epoxycyclohexylmethyl)adipate and di(2,3-epoxycyclohexylmethyl)cyclohexanecarboxylate.

Another group of materials include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 2,3-epoxycyclohexylmethyl 2,3-epoxycyclohexanoate, and 3,4-epoxycyclohexyl 3,4-epoxyoctanoate, and the like.

Another group of materials having epoxy groups include epoxidized esters of unsaturated monocarboxylic acids and polyhydric alcohols, such as ethylene glycol di(2,3-epoxycyclohexanoate), glycerol tri-2,3-epoxycyclohexanoate) and pentanediol di(2,3-epoxyoctanoate).

Still another group of epoxy compounds include epoxidized derivatives of polyethylenically unsaturated polycarboxylic acids, such as, for example, dimethyl 8,9,12,13-diepoxyeicosanedioate, dibutyl 7,8,11,12 - diepoxyoctadecanedioate, dioctyl 10,11 - diethyl-8,9,12,13-diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl - 5,6,10,11 - diepoxyoctadecyl succinate.

Still another group comprises the epoxidized polyesters, such as polyesters obtained by reacting unsaturated polycarboxylic acids and/or unsaturated polyhydric alcohols, such as, for example, polyesters of maleic anhydride and ethylene glycol, polyesters of tetrahydrophthalic anhydride and ethylene glycol, polyesters of phthalic anhydride and 1,4-butenediol and the like.

Another group comprises the epoxidized polymers and copolymers of diolefins, such as butadiene. Examples of this include, among others, butadiene-acrylonitrile copolymers, butadiene-styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The polycarboxylic acids and anhydrides used in preparing the condensates of the present invention comprise the polycarboxylic acids (or their anhydrides), and preferably those containing at least three carboxyl groups. The acids may be saturated, unsaturated, aliphatic, cycloaliphatic or aromatic and may be substituted with substituents, such as OH groups, chlorine atoms, ether radicals and the like. Examples of the acids include, among others, adipic acid, suberic acid, azelaic acid, succinic acid, chlorosuccinic acid, octadecylsuccinic acid, dodecylsuccinic acid, phthalic anhydride, isophthalic anhydride, terephthalic acid, and particularly the acids obtained by polymerizing unsaturated fatty acids, such as acids derived from drying and semi-drying oils as linseed, soybean, perilla, oiticica, tung, walnut and dehydrated castor oil, as linoleic acid, linolenic acid, eleostearic acid, licanic acid and the like. The polymerization of such acids can be accomplished by conventional techniques such as use of heat, peroxides and the like. Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structures of some of the polymerized acids are shown in Industrial and Engineering Chemistry, vol. 33, page 89 (1941).

Preferred acids are the dimerized or trimerized acids obtained from the ethylenically unsaturated fatty acids derived from semi-drying and drying oils, and particularly, the conjugated fatty acids containing from 12 to 20 carbon atoms. The generic structure of the resulting trimerized acids is believed to be that of the following:

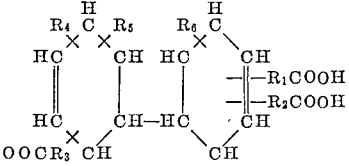

In the above formula, $R_1$, $R_2$ and $R_3$ constitute alkylene radicals having between 4 and 10 carbon atoms each while $R_4$, $R_5$ and $R_6$ are alkyl radicals having between 4 and 10 carbon atoms each. Normally, the product will have the generic formula as follows:

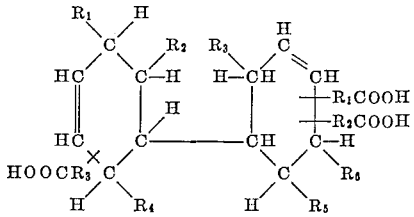

Particularly preferred acids to be employed in the preparation of the condensates of the present invention include the aliphatic, cycloaliphatic polycarboxylic acids containing at least 8 carbon atoms and preferably between 10 and 40 carbon atoms. Particularly preferred polycarboxylic acids are those containing at least 2 carboxyl groups and from 18 to 36 carbon atoms and particularly the dimerized and trimerized unsaturated fatty acids.

The reaction between the above-described polyepoxides and the polycarboxylic acids is accomplished in the presence of a liquid hydrocarbon and preferably those having a boiling point above 100° C. Examples of these include kerosene extracts, extracts of lube distillates, such as may be obtained by solvent extraction of lube oil fractions with appropriate polar solvents, such as liquid sulfur dioxide, furfural, phenol and mixed cresols with propane. The lube oil distillates used in the extraction are obtained by a vacuum distillation of petroleum crudes and preferably have the following physical properties: flash point ranging from 300° F. to 500° F., viscosities SSU at 100° F. ranging from 75 to 240 and A.P.I. gravity from 10 to 30. The extractions obtained by the above-noted solvent extraction of the distillates are light colored fluid materials having a flash point ranging from 400 to 500, viscosities ranging from 110 to 160 and A.P.I. gravity of 10 to 17. Examples of other liquid hydrocarbons that might be used include high boiling fractions, distillates, catalytically cracked gas oil, fuel oils such as Bunker C oil, and various coal tar fractions, such as middle oil, refined coal tars and the like.

Less preferred materials to be employed include the asphalts, such as straight run, blown, cracked and catalytically or non-catalytically polymerized asphalts and especially the straight run asphalts used for paving such as those having penetrations between 40 and 300 and softening points within the range of 145° F. to about 95° F. Blown asphalts are normally produced in the presence or absence of catalysts by blowing asphalts or fluxes at elevated temperatures with an oxygen containing gas such as air. Typical blown asphalts may have softening points between 300° F. and 120° F. and a penetration within the range of 100 to 0. Aromatic asphalts such as those comprising the bottoms products from the distillation of catalytically cracked gas oil are also preferred.

Other materials include the coal tar products such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in Vol. II, Abraham, "Asphalts and Allied Substances," 5th Edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches and other coal tar products may be found on pages 384 to 405 of Abraham, "Asphalts and Allied Substances," and such examples are incorporated herein by reference.

Particularly preferred materials to be employed include the lube oil distillates, lube oil extracts, raffinates from lube oil extracts, road oils, residual fuel oils, and preferably fuel oils having a viscosity between 10 cs. at 100° F. to about 1500 cs. at 100° F. middle oil from coal tar, refined coal tars, pine oils, and paving grade asphalts.

The new condensates of the present invention are prepared by heating the polycarboxylic acid or anhydride thereof with the polyepoxide in the presence of the above-described liquid hydrocarbons.

The amount of the polycarboxylic acid or anhydride and the polyepoxides to be employed is critical. Unless the proper proportions are utilized the resulting product will be an insoluble infusible product which cannot be used in the application. In order to obtain the desired soluble non-heat convertible epoxy containing condensates of the present invention, it is essential that the acidic component be reacted with at least 1.5 times the chemical equivalent amount of the polyepoxide as used herein and in the amount claimed. The expression of "chemical equivalent" in relation to the acidic and polyepoxide mixtures refers to the amount needed to furnish one epoxy group for every acidic group. Preferably the acidic component and the polyepoxide are combined in chemical equivalent ratios varying from 1:2 to 1:4.

It is usually desirable in mixing the components to add the acid slowly to the polyepoxide over a period of time in order to prevent the accumulation of a large concentration of the acid in any portion of the reaction mixture.

The amount of the liquid hydrocarbon to be used in the reaction may vary over a considerable range. The amount should make up at least 8% by weight of the combined mixture of polyepoxide and acidic component, preferably from 25% to 100% by weight of the combined mixture.

The reaction takes place without the use of additional catalytical components; however, it may be desirable to add small amounts of materials such as tertiary amines, quaternary ammonium salts and organo substituted phosphines in amounts varying from .05% to 3% by weight of the reactants to speed the formation of the condensates.

Temperatures employed in the reaction will generally vary from about 50° C. to 200° C. In most cases, the acidic component and the polyepoxide will be quite reactive and temperatures in the order of about 50° C. to 125° C. will be sufficient to effect the desired reaction. In other instances, it will be desirable to use higher temperatures such as those of from 100° C. to 175° C.

The reaction is preferably conducted under atmospheric pressure, but it may be advantageous in some cases to employ subatmospheric or superatmospheric pressures.

The reaction is preferably continued until substantially all of the polycarboxylic acid or anhydride has been consumed. This can be easily indicated by the determination of the acid number of the reaction mixture.

At the conclusion of the reaction, the reaction mixture can be used directly as such for the intended applications as noted hereinafter. If desired the condensates may by recovered by distillation, extraction and the like.

The condensates when separated from the reaction mixture will vary from viscous liquids to solid resins. The products will be substantially free of acidic groups and will contain more than one epoxy group. The products prepared from the acids as the acidic component will contain some free OH groups formed during the reaction, but those obtained from the anhydrides will be relatively free of formed OH groups. The new condensates will be soluble in solvents such as acetone, toluene, benzene, xylene and the like. The products will be of much higher molecular weight than the basic polyepoxide from which they are formed, and will contain at least 2 epoxy groups and preferably 2 to 5 epoxy groups.

The products prepared from the above reaction may be described as having the formula

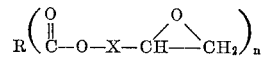

wherein R is derived from the polycarboxylic acid or anhydride by removing the carboxyl groups or anhydride groups, X is the residue of the polyepoxide having terminal epoxy groups and $n$ is an integer preferably ranging from 2 to 5.

The particularly preferred condensates are those derived from the polycarboxylic acids containing at least 2 carboxyl groups and the glycidyl polyethers of the polyhydric phenols. These particularly preferred condensates may be represented by the following formula

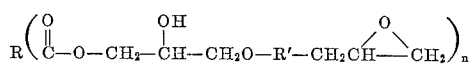

wherein R is derived from the polycarboxylic acid, R' is derived from the dihydric phenol used in making the glycidyl ether and $n$ is an integer from 3 to 5.

The new compositions of the invention are particularly useful and valuable as sealers, overlays and as binders for aggregate in the preparation of surfaces for roadways, walkways and airstrips. In these applications, the new compositions may be used as such, or they may be further mixed with additional quantities of any of the above-described bituminous materials used in their preparation to obtain desired fluidity or with other types of resinous materials, liquids, plasticizers, stabilizers and the like.

Curing agents are employed in order to convert the material to the desired insoluble infusible product. Examples of the curing agents include among others, acidic, neutral or alkaline materials, as alkalies as sodium or potassium hydroxides; alkali phenoxides like sodium phenoxide; carboxylic acids or anhydride, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride or boron trifluoride as well as complexes thereof with ethers, acid anhydrides, ketones, diazonium salts, etc.; salts, such as zinc fluoborate, magnesium perchlorate and zinc fluosilicate; phosphoric acid and partial esters thereof including n-butyl ortho-phosphate, diethyl ortho-phosphate hexaethyl tetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, N-aminoethylpiperazine tetramethyl piperazine, N,N-diethyl-1,3-propane diamine, 1,2-diamino-2-methylpropane, 2,3-diamino-2-methylbutane, 2,4-diamino-2-methylpentane, 2,4-diamino-2,6-dimethyloctane, dibutylamine, dinonylamine, distearylamine, diallyl amine, dicyclohexylamine, ethylcyclohexylamine, o-tolylnaphthylamine, pyrrolidine, 2-methylpyrrolidine, tetrahydropyridine, 2-methylpiperidine, 2,6-dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and secondary aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$-complexes are preferably employed in amounts varying from about 0.5% to 20% and the metal salts are preferably employed in amounts varying from about 1% to 15%. The secondary primary amines, acids and anhydrides are preferably employed in at least stoichiometric amounts, i.e., sufficient amount to furnish one amine hydrogen or one anhydride group for every epoxy group, and more preferably stoichiometric ratio varying from 1:1 to 25:1.

If the composition is to be employed as a sealer or coating composition or as a binder in the preparation of overlays or new surfaces where it is desired to effect the curing agents which are employed at ambient temperatures which are aliphatic, cycloaliphatic, primary and secondary amines such as diethylene triamine ethylene diamine, adducts of polyamines and monoepoxides, and amino containing polyamides such as those obtained by reacting polymerized unsaturated fatty acids with aliphatic polyamines and the like. If heat can be employed in the cure of the composition such as in the preparation of castings and pottings, laminated composition cases, moldings and the like other types of epoxy curing agents may be employed such as polycarboxylic acids and anhydrides, boron trifluoride complexes metal salts and the like. These components are employed in the amounts described herein above for the curing agents.

The ratio of the bituminous materials and the condensate in the final coating compositions may very depending upon the properties desired in the resulting compositions. Compositions having the above-described superior properties such as good adhesion, good resistance to solvents and heat and good wear resistance are obtained when the condensates make up at least 10% by weight of the mixture and preferably between 15% and 85% by weight of the mixture of condensate and bituminous material.

When the new compositions are used as a sealer material or in the preparation of an overlay for an already prepared surface, it is preferred to mixing the composition with the desired curing agent and spread the mixture over the desired surface which has been preferably cleaned with acids or detergents before the addition of the coating. If a skid resistant surface is desired, small inert particles such as sand, etc. may be sprinkled on top of the coating before the coating sets hard. The inert particles may also be mixed in with the composition before the application as a coating. In this case the particles may be added in small quantities as a filler or in larger quantities so as to form a thick slurry with the new compositions. The particles may be heated if desired to assist in the cure. Thus, small particles as sand may be heated to temperatures ranging from about 150° F. to 400° F. to speed cure of coatings applied to large areas.

When used as binder for aggregate in the formation of thicker layers which may act as new surfaces or as thick overlays of other surfaces, it is desired to mix the new compositions with the aggregate and curing agent so as to form the desired slurry and then pour this mixture on the desired surface and level the coating with screeds, trowels, brooms and the like.

The inert particles and aggregate used in preparing the above-noted surfacing compositions may be particles of any inert solid material. The particles in general should be cut into small particle size and preferably of mesh size varying from 4 to 200. Preferred materials include sand, finely divided rocks, divided shells, crushed quartz, aluminum oxide, and the like. Particularly preferred are the mineral, and especially siliceous materials, such as, for example, sand and small rocks or crushed rock. Mixtures of the various types of particles may also be used.

The amount of the particles or aggregate employed may vary over a wide range. When applied over the surface of the composition, it is usually desired to apply sufficient particles to cover the coating with a thin layer. When added directly, sufficient particles are added to form a workable slurry. In most cases, the amount of inert particles will vary from about 40% to 1000% by weight of the total mixture.

When used as coatings, the compositions of the invention may be applied to any surface, but are particularly suitable for use as surfacing compositions for concrete, asphalt, wood, and steel. The concrete may be of any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about 1/16 inch to about 1/2 inch.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight. Polyethers referred to are those described in U.S. 2,633,458.

*Example 1*

This example illustrates the preparation and properties of an epoxy containing composition from Polyether A, trimerized linoleic acid, and kerosene extract.

56.1 parts of Polyether A was combined with 40.2 parts of trimerized linoleic acid and 59.5 parts of kerosene extract. This mixture was stirred and maintained at 100° C. for several hours until substantially all of the trimerized acid had been consumed as indicated by the low acid number.

To this mixture was added 40.5 parts of titanium dioxide pigment and 3.7 parts of diethylene triamine. This composition was spread out on cement surfaces and asphalt surfaces to form a film of about 120 mils thickness. Sand was sprinkled on top of the coating to give a non-skid surface. The coating was then allowed to cure at ambient temperature. The resulting coating was very hard and tough and had good adhesion to the surfaces. The coating also displayed excellent resistance to solvents as indicated by repeated contact with jet fuels and excellent resistance to heat. The composition thus appeared to be an ideal low cost pigmented coating for large areas such as walkways, roadways, airstrips, and the like.

*Example II*

This example illustrates the preparation of a condensate of Polyether A and trimerized linoleic acid in an extract of lube distillate.

195 parts of Polyether A was combined with 100 parts of trimerized linoleic acid and 247.6 parts of a liquid extract of lube distillate having the following properties: (Dutrex 14) Sp. Gravity API 14.7; flash point 285° F. and viscosity SSU at 110° F. of 81. This mixture was stirred and maintained at 150° C. for one-half hour until substantially all of the trimerized acid had been consumed as indicated by the low acid number. To this mixture was added 3.1 parts of carbon black and 14.5 parts of diethylene triamine and the mixture spread out on cement and asphalt surfaces to form films of about 130 mils thickness. Sand was sprinkled on top of the coating and compacted by rolling. The coating was allowed to cure at ambient temperature. The resulting coating was very hard and tough and had good skid resistance. The coating also displayed excellent resistance to solvents as indicated by repeated contact with jet fuels and excellent resistance to heat.

*Example III*

This example illustrates the preparation of a low cost pigmented seal coat for cement and asphaltic surfaces.

56.1 parts of Polyether A was combined with 40.2 parts of trimerized linoleic acid and 38.6 parts of kerosene extract and 20.9 parts of a mixture of extract of lube distillate (furfural extract having flash point of 415° F., viscosity SSU at 210° F. of 96.7 and Sp. Gr. 1.032) 87.5% and 12.5% by weight of sweetened short residue extract. This mixture was stirred and maintained at 100° C. for several hours until substantially all of the trimerized acid had been consumed. The resulting product was a light colored fluid liquid.

40.5 parts of titanium dioxide and 3.7 parts of diethylene triamine were added to the above composition and the mixture spread out in a thin layer over cement and asphalt surfaces. The coating was then allowed to cure at ambient temperature (20° C.). The resulting coating was very hard and tough and had good adhesion to the cement and asphalt surfaces. The coating also displayed excellent resistance to solvents and heat and had good resistant to outdoor weather conditions.

*Example IV*

60.7 parts of Polyether A was combined with 29.7 parts of trimerized linoleic acid, 28.6 parts of kerosene extract and 37.9 parts of a mixture of an extract of lube distillate and sweetened short residue extract defined in the preceding example. This mixture was stirred and maintained at 100° C. for several hours until substantially all of the trimerized acid had been consumed. The resulting product was a light colored fluid liquid.

9.5 parts of iron oxide and 4.6 parts of diethylene triamine were added to the above composition and the mixture spread out as a sealer coat over cement and asphalt surfaces. The coating was then allowed to cure at ambient temperature (20° C.). The resulting coating was very hard and tough and had good adhesion to the cement and asphalt surfaces. The coating also displayed excellent resistance to solvents and heat and good resistance to outdoor weather conditions.

*Example V*

This example illustrates the preparation of a low cost binder for aggregate and the use of the resulting composition in forming an overlay for cement and asphalt surfaces.

37.5 parts of the condensate of Polyether A and trimerized linoleic acid prepared as in Example I was combined with 10 parts of diethylene triamine and 62.5 parts of straight run asphalt and the mixture stirred with heating. The composition was then mixed with finely divided rock so as to form a composition having 90 parts of aggregate per 10 parts of binder. This mixture was spread out to form a coating of about ¾ to 1 inch thickness and the layer compacted by rolling. The layer was then allowed to cure at ambient temperature (20° C.). The resulting layer was very strong and tough and had good resistance to solvents and heat and was ideally suited for use as an overlay for jet airstrips.

*Example VI*

200 parts of Polyether A was mixed with 108 parts of dimerized linoleic acid, 54 parts of trimerized linoleic acid and 180 parts of an $SO_2$ extract of a light lube distillate having the following properties: API gravity, 12.7; ref. index, 1.556; flash point, 285° F.; viscosity SUS at 100° F.–84.6; aniline point, 84° F.

This mixture was heated to 150° C. for about 2 hours until the acid number dropped to 2–3. There was no difficulty with premature gelation. Analysis-acidity 0.001 eq./100 g., OH value eq./100 g. 0.14 and epoxide value– 0.08 eq./100 g. (100% of theory).

The above mixture was heated for 7 days at 107° C. and there was still no gelation indicating that the product is fusible, i.e., is not converted on heat to an insoluble product.

100 parts of the above composition was mixed with 20.5 parts of straight run asphalt and 2.1 parts of diethylene triamine and the mixture kept at 60° C. for several hours. The resulting product was a hard, flexible casting.

The above composition was also used as a binder for aggregate as described in Example V. Related results are obtained.

*Example VII*

214 parts of Polyether A, 128 parts of trimerized linoleic acid, 43 parts of soya fatty acids and 193 parts of extract of lube distillate noted in the preceding example were combined together and heated to 125° C. for about 2 hours until the acid number was dropped to 2 to 3. Analysis of the resulting liquid composition was: Acidity, 0.001 eq./100 g.; hydroxyl, 0.13 eq./100 g.; epoxy, 0.097 eq./100 g.

100 parts of the above composition was mixed with 25 parts of asphalt and 4 parts of diethylene triamine and the mixture kept at 60° C. for several hours. The resulting product was a hard, flexible casting.

The above composition was also used as a binder for aggregate in the preparation of a surfacing composition as in Example V. Related results are obtained.

*Example VIII*

200 parts of Polyether A, 162 parts of dimerized linoleic acid and 180 parts of pine tar were mixed together and heated to 135° C. until the acid number was reduced to 2 to 3 (about 3 hours).

The above product was mixed with 5 parts of diethylene triamine and heated to 80° C. The resulting product was a hard flexible casting.

A composition prepared as above was used to prepare a nonskid coating for cement and asphalt surfaces as in Example I. Related results are obtained.

*Example IX*

Example I is repeated with the exception that the trimer acid is replaced with equivalent amounts of each of the following: 8,10-eicosadienedioic acid, phthalic acid, isophthalic acid, hexahydrophthalic acid anhydride. Related results are obtained.

*Example X*

Example I is also repeated with the exception that Polyether A is replaced with each of the following: Polyether B, Polyether C and Polyether D. Related results are obtained.

*Example XI*

Example I is repeated with the exception that middle oil derived from coal tar was used in place of the lube distillate extract. The resulting composition could be cured with diethylene triamine to give a hard casting.

What is claimed is:

1. A process for preparing an epoxy-containing composition which avoids the problem of gelation and is accomplished without the use of a catalyst which consists of heating a polycarboxylic acid with at least 1.5 times the chemical equivalent amount of a polyepoxide containing more than one epoxy group in the presence of a bituminous material.

2. A process as in claim 1 wherein the bituminous material is an extract of a lube distillate having the following properties; flash point between 400° F. and 500° F., viscosity SSU at 100° F. between 110 and 160 and API gravity from 10 to 30.

3. A process as in claim 1 wherein the bituminous material is a kerosene extract.

4. A process as in claim 1 wherein the bituminous material is an Edleanu extract of a lube distillate having the following properties; flash point between 400° F. and 500° F., viscosity SSU at 100° F. between 110 and 160 and API gravity from 10 to 30.

5. A process as in claim 1 wherein the bituminous material is a furfural extract of lube distillate having the following properties; flash point between 400° F. and 500° F., viscosity SSU at 100° F. between 110 and 160 and API gravity from 10 to 30.

6. A process as in claim 1 wherein the polycarboxylic acid is a trimerized unsaturated fatty acid.

7. A process as in claim 1 wherein the polyepoxide is a glycidyl polyether of a polyhydric phenol having an epoxy equivalency greater than 1.0.

8. A process as in claim 1 wherein the polyepoxide is a glycidyl ether of 2,2-bis(4-hydroxyphenyl)propane having a molecular weight between 200 and 900.

9. A process as in claim 1 wherein the polycarboxylic acid and the polyepoxide are combined in a chemical equivalency ratio varying from 1:1.5 to 1:4.

10. A process for preparing an epoxy-containing condensate composition which avoids the problem of gelation and is accomplished without the use of a catalyst which consists of heating a polycarboxylic acid with from 1.5 times to 4 times the chemical equivalent amount of a polyepoxide containing more than one epoxy group in the presence of at least 8% by weight of a liquid bituminous hydrocarbon material having a boiling point above 100° C., said heating being accomplished at a temperature between 50° C. and 200° C.

References Cited by the Examiner

UNITED STATES PATENTS

| | | | |
|---|---|---|---|
| 969,449 | 9/1910 | Blake. | |
| 2,528,417 | 10/1950 | Bradley. | |
| 2,599,986 | 6/1952 | Goebel et al. | |
| 2,824,078 | 2/1958 | Mellick | 260—28 |
| 2,906,720 | 9/1959 | Simpson | 260—28 |
| 2,970,983 | 2/1961 | Newey | 260—47 |

MORRIS LIEBMAN, *Primary Examiner.*

ALPHONSO D. SULLIVAN, ALEXANDER H. BRODMERKEL, *Examiners.*

J. ZIEGLER, D. C. KOLASCH, B. A. AMERNICK,
*Assistant Examiners.*